United States Patent [19]

Stemwedel, Jr.

[11] Patent Number: 4,720,044

[45] Date of Patent: Jan. 19, 1988

[54] ELECTRIC ARC SPRAY METALIZING APPARATUS

[75] Inventor: Robert J. Stemwedel, Jr., Eagle, Colo.

[73] Assignee: Eagle Arc Metalizing Company, Eagle, Colo.

[21] Appl. No.: 808,826

[22] Filed: Dec. 13, 1985

[51] Int. Cl.[4] .......... B05B 1/24; B05B 1/28; B64D 13/00; A47B 77/08

[52] U.S. Cl. .......... 239/84; 239/290; 239/299; 312/223; 427/377; 98/1.5

[58] Field of Search .......... 239/79, 83, 84, 290, 239/299; 219/76.14; 427/377; 118/50; 312/223; 98/115.3, 1.5

[56] References Cited

U.S. PATENT DOCUMENTS

| | | | |
|---|---|---|---|
| 1,940,814 | 12/1933 | Saeger, Jr. | 29/DIG. 39 |
| 2,261,279 | 11/1941 | Pellar | 239/290 |
| 2,465,162 | 3/1949 | Lockwood | 98/1.5 |
| 2,610,565 | 9/1952 | Stuart | 98/1.5 |
| 2,749,176 | 6/1956 | Steyer | 239/80 |
| 2,876,330 | 3/1959 | Reinhardt | 219/76.14 |
| 3,062,451 | 11/1962 | Keohane | 239/79 X |
| 3,339,055 | 8/1967 | Carter | 219/76.14 |
| 3,546,415 | 12/1970 | Marantz | 219/76.14 |
| 3,818,175 | 6/1974 | Essers | 219/121 PS X |
| 4,078,097 | 3/1978 | Miller | 239/83 X |

OTHER PUBLICATIONS

Reprint from the Jan. 5, 1962 Issue of "Sandia Corporation Lab News".

*Primary Examiner*—Andres Kashnikow
*Assistant Examiner*—Patrick Burkhart
*Attorney, Agent, or Firm*—John R. Ley

[57] ABSTRACT

An electric arc spray metalizing apparatus includes a spray gun which delivers a metalizing coating to the substrate, and a wire feed drive mechanism which pushes wires to the spray gun through cables. The wire is pushed by a pair of drive contact rollers or devices which are connected in a tandem relationship and operatively contact each wire to individually impart driving or pushing force to the wire. The wires are directed at the spray gun to an intersection point where electrical energy creates an arc for consuming the ends of the wires at the intersection point. The wires are electrically charged by contact with a curved wire guide as the wires are bent when pushed through the wire guide. A flow stream of pressurized gas is directed onto the intersection point and the molten metal of the consumed wire ends is directed in a spray stream of molten metal particles. A pair of deflecting streams of pressurized gas influence the spray stream by deflecting it into an elliptical or elongated deposition pattern. The orientation of the spray stream and deposition pattern can be changed relative to the spray gun by rotating a deflection housing which creates the deflecting streams. The wire feed drive mechanism includes a housing for shielding the interior elements from the ambient environment, and a supply of pressurized gas is directed to the interior of the housing to prevent the entrance of airborne particles.

5 Claims, 15 Drawing Figures

Fig_2
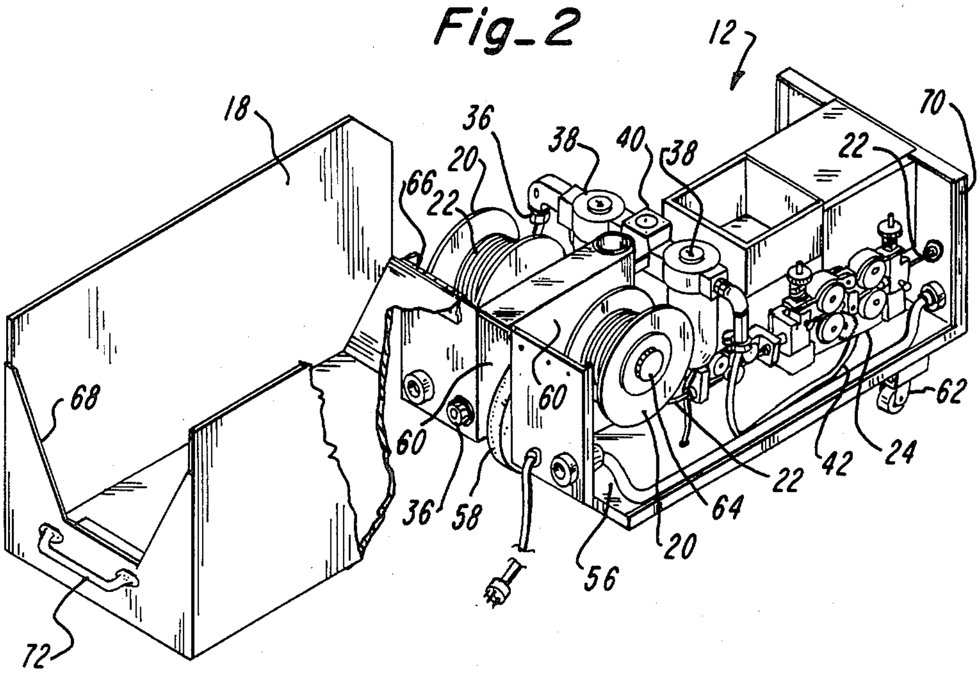
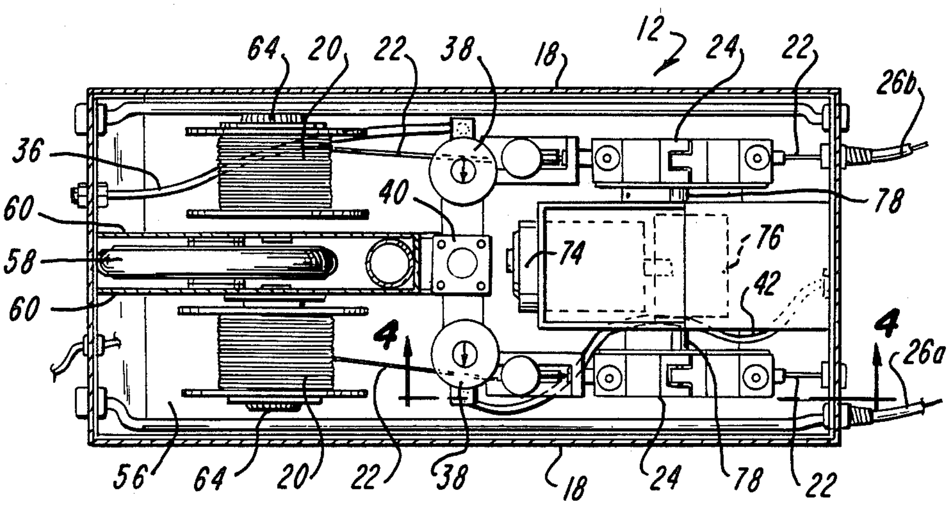
Fig_3

ELECTRIC ARC SPRAY METALIZING APPARATUS

The present invention pertains to thermal spraying of metallic coatings, and more particularly to an electric arc spray metalizing apparatus for creating and applying a metalizing coating.

BACKGROUND OF THE INVENTION

The typical electric arc spray metalizing apparatus utilizes a spray gun in which a pair of metal wires are brought together at an intersection point. Each of the metal wires is separately charged with electrical current. At the intersection point of the two wires, an electric arc is created. The electric arc is of sufficient energy to melt the wires. A jet or stream of compressed gas, usually air, is focused on the intersection point. The air atomizes the molten metal into particles and propels them in a spray stream onto a substrate. The separately charged wires are continuously driven forward and the electrical arc is maintained at the intersection point as the ends of the wires are continuously consumed in the energy of the arc. A coating is formed on the substrate as the metalized particles impact and distribute over the substrate.

According to the predetermined type of wire used, coatings having specific or predetermined surface characteristics can be found. For example, coatings having high resistance to corrosion may be achieved, while other coatings may achieve predetermined characteristics for oil retention, surface porosity, wear resistance, surface hardening and the like. By applying repeated coatings, worn parts can be rebuilt by increasing their thickness. Parts rejected in a manufacturing process due to mis-machining during production can be salvaged by building up the surface through multiple coatings and then machining the part to the correct dimensions. Castings can be saved by applying a metalized coating to the surface of the casting to decrease unacceptable porosity. In general, the advantages of electric arc metalizing, compared to other thermal spraying techniques, include faster deposition rates, greater bond strengths, less elaborate surface preparation, and reduced oxides.

One of the most common uses for spray metalizing technology is for coating equipment and structures to inhibit corrosion. The structure, equipment or other substrate is typically sandblasted prior to applying the metalizing coating. The sandblasting removes old coating materials and corrosion from the substrate. The sandblasting also creates substantial dust, grit, and other airborne particles in the environmental area where the spray metalizing apparatus is in use. An over-spray effect from the spray stream of molten metal particles is also present, due to the spraying aspects of metalizing technique. The dust, grit and other airborne particles have created particular problems in achieving the desired use of some types of prior electric arc spray metalizing equipment.

The dust, grit and airborne particles have a tendency to be attracted to the charged wires and to be drawn into the hollow cables through which the wires are directed to the spray gun. An accumulation of the dust, grit and other particles within the cables can increase the movement resistance of the wires and may ultimately prevent the wires from being reliably fed through the cables. Added or variable movement resistance can also cause uneven drive rates of one wire with respect to the other. The electric arc may even extinguish if radical differences exist between the drive rates. The position of the intersection point may be altered, thus altering the spray stream pattern of molten metal particles. An altered spray stream pattern may result in an uneven coating as a result of an uneven deposition of molten particles on the substrate. If ends of the intersecting wires are not approximately equally consumed in the arc, relatively large chunks or pieces of unmelted wire material may be transferred in the spray stream onto the substrate, thereby creating undesirable surface characteristics in the coating. Of course, aggravated wire feeding problems make the selective starting and stopping of the electric arc more difficult, thus increasing the overall time and cost required to coat a given area of substrate surface.

The potential for wire feeding problems also increase when relatively long cables are employed. Relatively long cables are sometimes desired to allow the spray gun to be more easily manipulated or when the size of the structure, equipment or substrate requires greater movement to cover the surface. Longer cables also increase the movement resistance of the wires.

For reasons of economy, it is usually desirable to coat relatively large surface areas rapidly. To achieve a high capacity metalizing coating effect, larger currents must be supplied, the wires must be driven faster or at greater rates, and wires of increased diameter must be employed. The larger wires provide more metal, and greater electrical currents assure that sufficient electrical power is available to consume the larger wires in the electric arc.

A variety of different wire feed mechanisms have been employed in electric arc spray metalizing apparatus. One type employs drive wheels positioned in the spray gun to pull the wires through the cables to the spray gun. Generally speaking, these drive wheels are relatively small and lack sufficient capability to grip the wires to pull them through relatively long cables in high capacity situations. Incorporating the drive wheels in the spray gun also increases the weight of the spray gun, making manipulation of the spray gun more difficult and tiresome. Another type of wire feed mechanism is a pushing unit, typically positioned at the end of the cable spaced away from the spray gun. While pushing wire feed mechanisms may develop greater force, many times they too are insufficient to adequately and reliably feed large wire through relatively long cables in high capacity situations. A third type of wire feed mechanism employs both a pulling drive mechanism positioned in the spray gun and a pushing drive mechanism positioned at the remote end of the cables. This type of arrangement usually incorporates the disadvantages of both the pushing and pulling mechanisms, without solving the problems of either type of mechanism, but increasing the complexity of the wire feed arrangement.

Unsatisfactory performance has been particularly perplexing in high capacity electric arc spray metalizing situations. Attempting to increase the spray metalizing capacity tends to magnify the effects of many of the disadvantages described above, and as a result, few, if any, high capacity electric arc spray metalizing devices are believed to exist. No known prior manually-operable electric arc spray metalizing device has satisfactorily solved all of the above described problems in a single piece of equipment or apparatus, under conditions of reliable and convenient use.

SUMMARY OF THE INVENTION

The present invention pertains to a new and improved electric arc spray metalizing apparatus. The inventive apparatus includes an improved wire feed drive mechanism for pushing the wire through the cables to the spray gun. In the wire feed drive mechanism, the pushing force is imparted to the wires by a pair of tandemly-positioned drive means such as drive or contact rollers. Each contact roller contacts the feed wire and imparts driving force to it. By utilizing two drive rollers positioned in a tandem relationship, increased driving force is applied to the wire. Furthermore, wires of larger diameter may be adequately fed through cables of increased length. Movement resistance of the wires within the cables is less likely to adversely affect the wire feed or drive rate.

A housing is also fitted over the wire feed drive mechanism. The housing encloses within its interior spools of the wire from which the wire is unrolled as the contact rollers push the wire into the cables. The interior of the housing is pressurized with pressurized gas such as air to protect the drive mechanism and the wires from the dust, grit and other ambient influences. The pressurized gas within the interior of the housing flows out through any gaps or spaces and inhibits the dust, grit and other airborne materials in the ambient environment from entering the interior of the housing, despite the electrical attraction of the charged wire. The pressurized housing creates no particular access problems to the interior of the wire feed drive mechanism, since access for purposes of adjusting the wire feed drive mechanism and changing the spools of wire from time to time is required. By pressurizing the interior, the extra mechanical details required to maintain a completely sealed housing are avoided, while still providing improved resistance to the entrance of dust, grit and other airborne particles.

The spray gun of the inventive apparatus comprises a pair of curved wire guides through which the wire passes immediately prior to reaching the arcing intersection point. The curvature of the wire guides assures increased surface contact of the wire by which to transfer the relatively high current from the electrically charged wire guides to the wire. Greater electrical energy can be transferred to sustain a higher energy arc for consuming larger diameter wires in high capacity spraying.

The spray gun also includes, in addition to the center forward directed jet stream of compressed air, a pair of deflecting gas jets which distort the atomized stream of molten metal particles into an elliptical or elongated spray pattern. The elliptical spray stream has the advantage of more uniformly distributing the molten metal particles over the surface of the substrate, as compared to a circular spray pattern. In a circular spray pattern there is a relatively high density of molten particles at the center with a radially decreasing distribution from the circular center point. The elliptical shape achieves a more uniform depth over a given area of the spray pattern, thereby reducing the number of sweeps or passes which must be made with the spray gun to obtain a uniform thickness coating. Means for adjusting the position of the deflecting gas jets allows the orientation of the elongated spray pattern to be adjusted without resorting to the inconvenience of tilting the spray gun.

Details of the invention are described in the following description of a preferred embodiment, and are shown in the accompanying drawings. The invention itself, however, is defined by the scope of the appended claims.

DRAWING DESCRIPTION

FIG. 2 is a perspective view of a wire feed drive mechanism of the apparatus shown in FIG. 1, with a housing thereof folded back and a portion of the housing broken out.

FIG. 3 is a top view of the wire feed drive mechanism which is taken in the plane of line 3—3 of FIG. 1 and which is also shown in FIG. 2.

Figure 4:
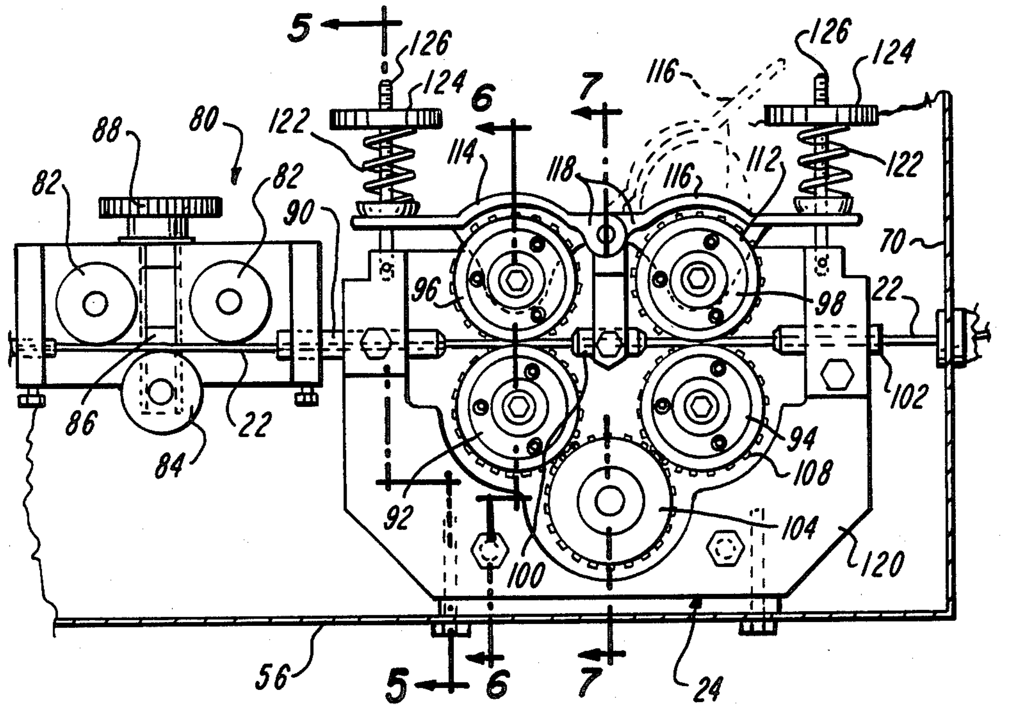
FIG. 4 is an enlarged section view taken in the plane of line 4—4 of FIG. 3, specifically illustrating a wire feed drive unit and the tandemly positioned drive means for one wire.
Figure 5:
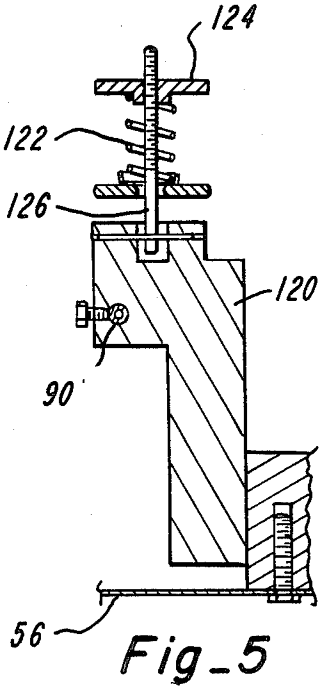
Figure 6:
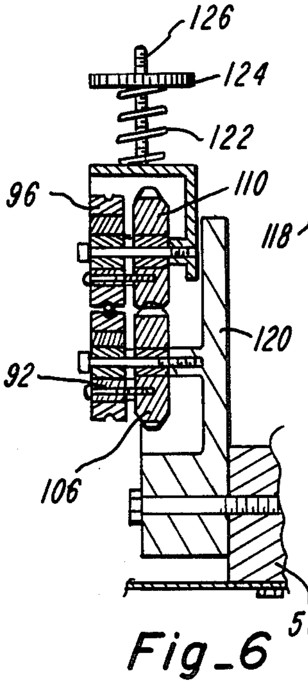
Figure 7:
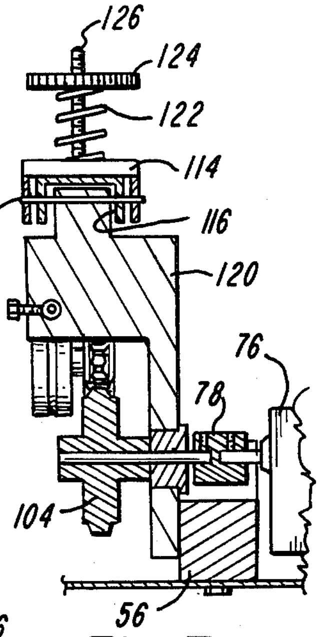

FIGS. 5, 6 and 7 are section views taken in the planes of lines 5—5, 6—6 and 7—7, respectively, of FIG. 4.

Figures 1, 15:
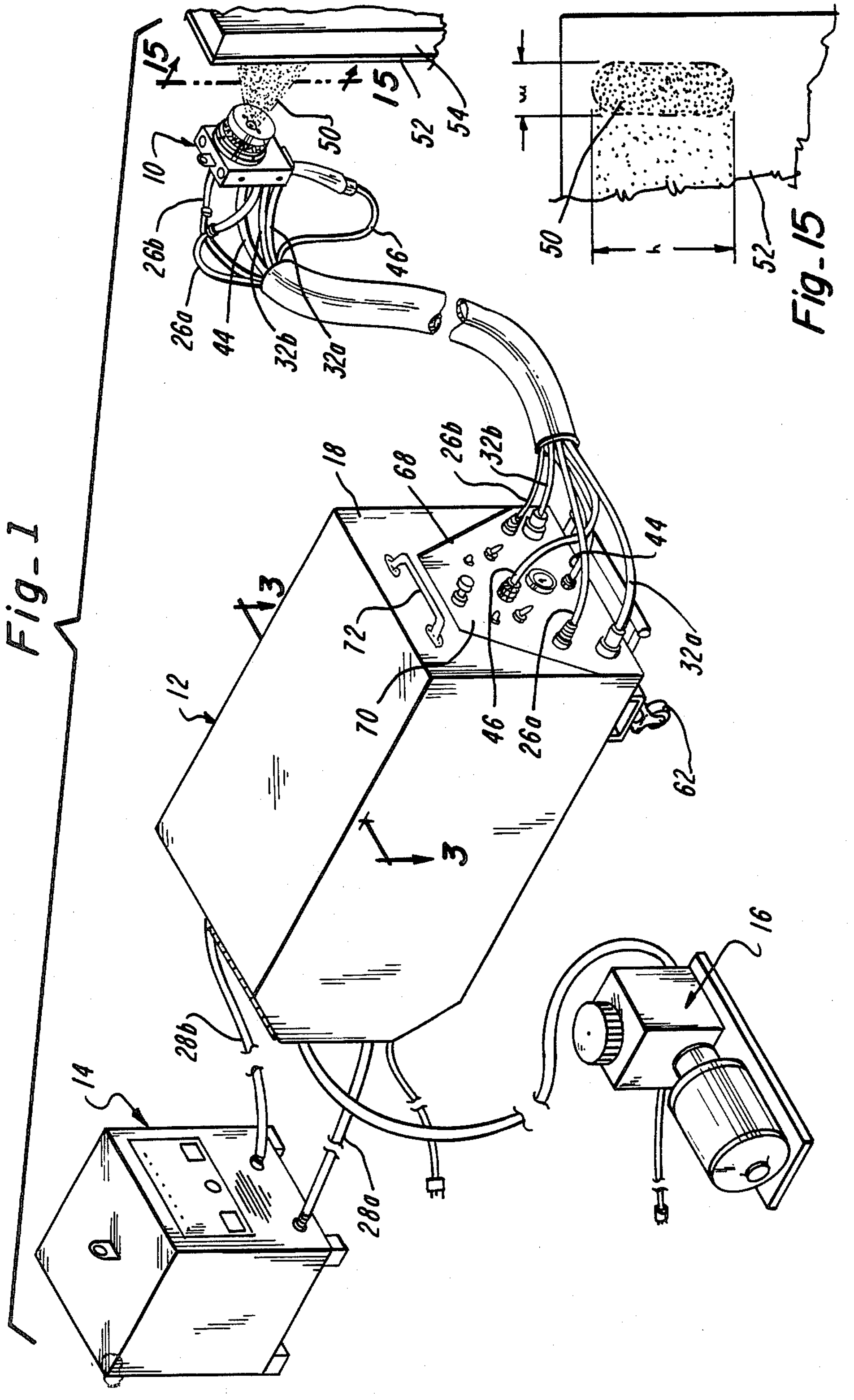
FIG. 1 is a perspective view of an electric arc spray metalizing apparatus of the present invention.
Figure 8:
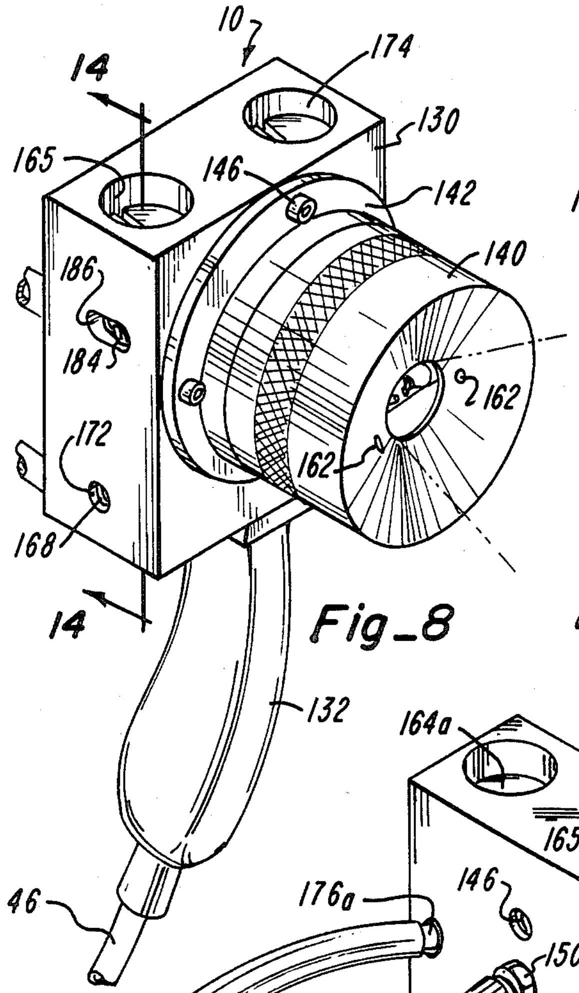

FIG. 8 is an enlarged front perspective view of the spray gun of the apparatus shown in FIG. 1.

Figure 9:
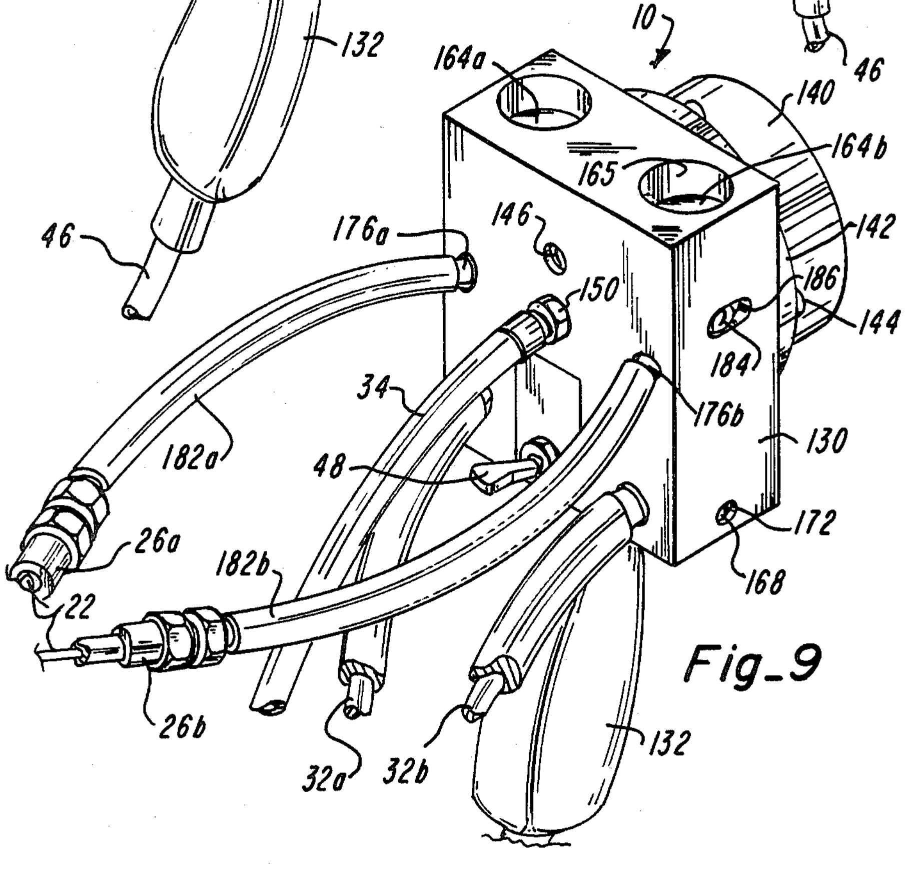

FIG. 9 is a rear perspective view of the spray gun shown in FIG. 8.

Figure 10:
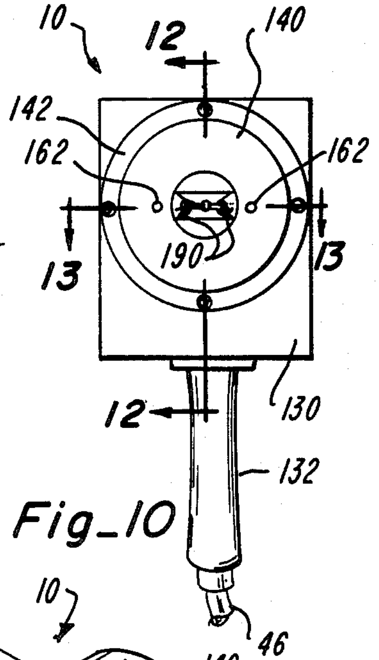

FIG. 10 is a reduced front elevational view of the spray gun shown in FIG. 8.

Figure 11:
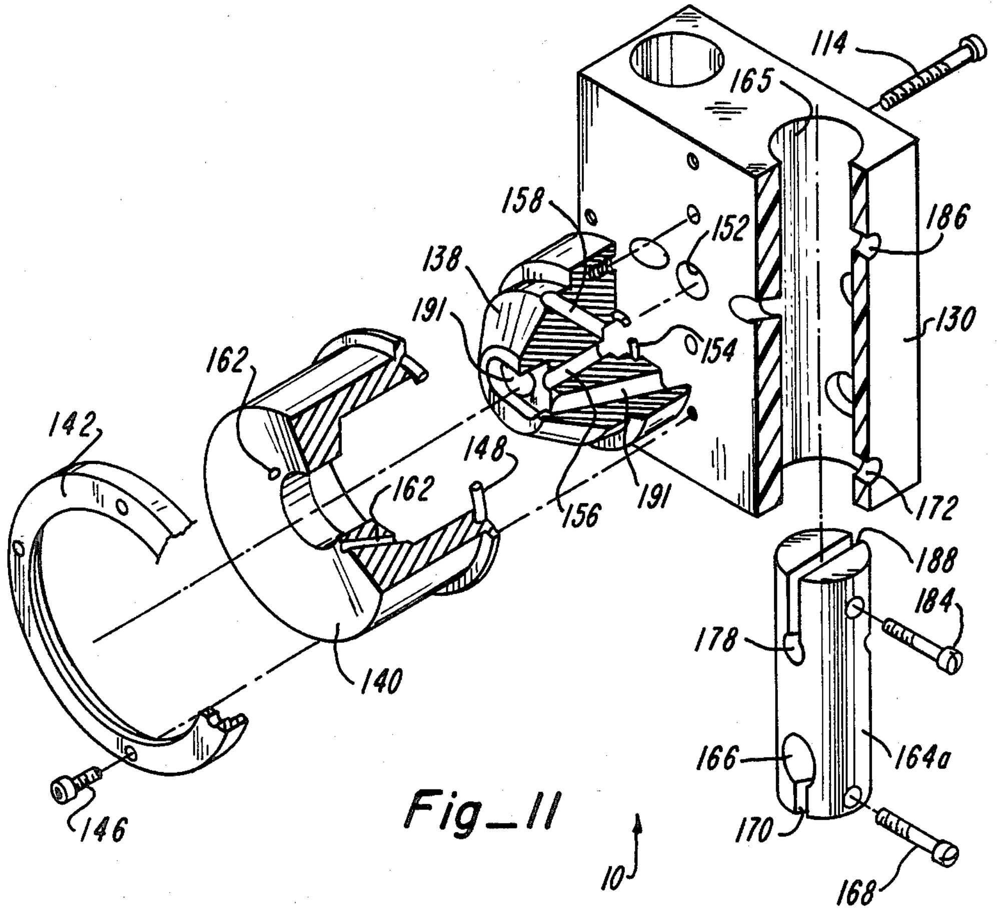

FIG. 11 is an assembly view, shown in front perspective, of the spray gun shown in FIG. 8.

Figure 12:
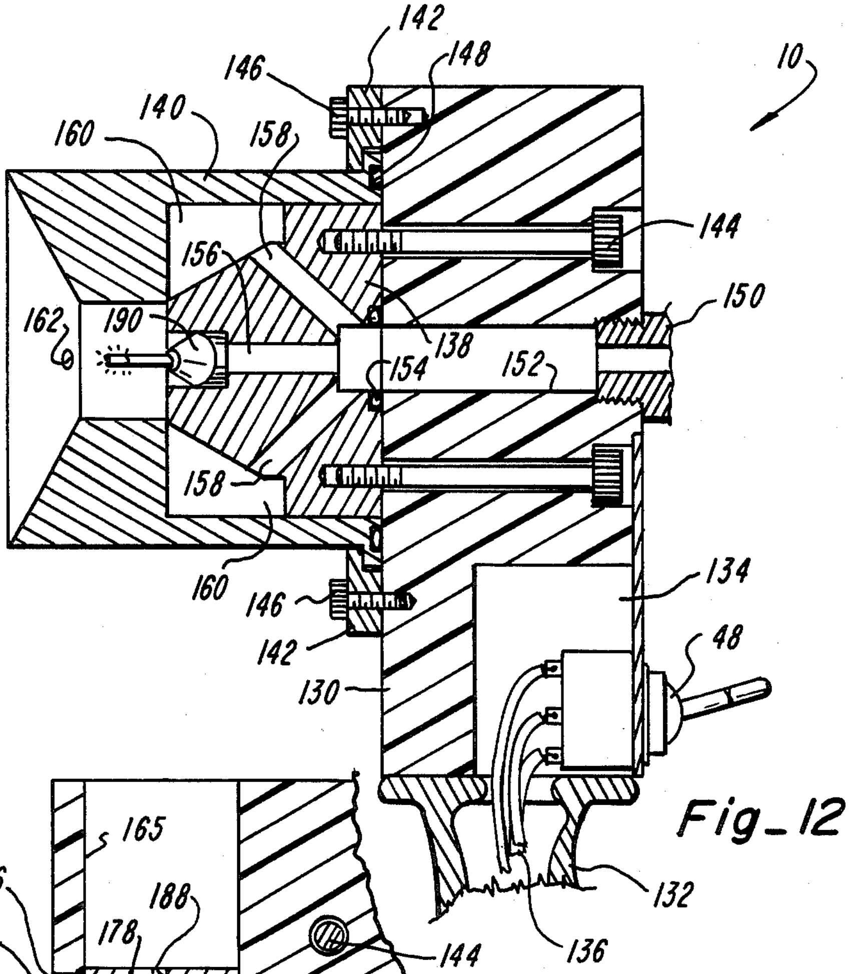
Figure 13:
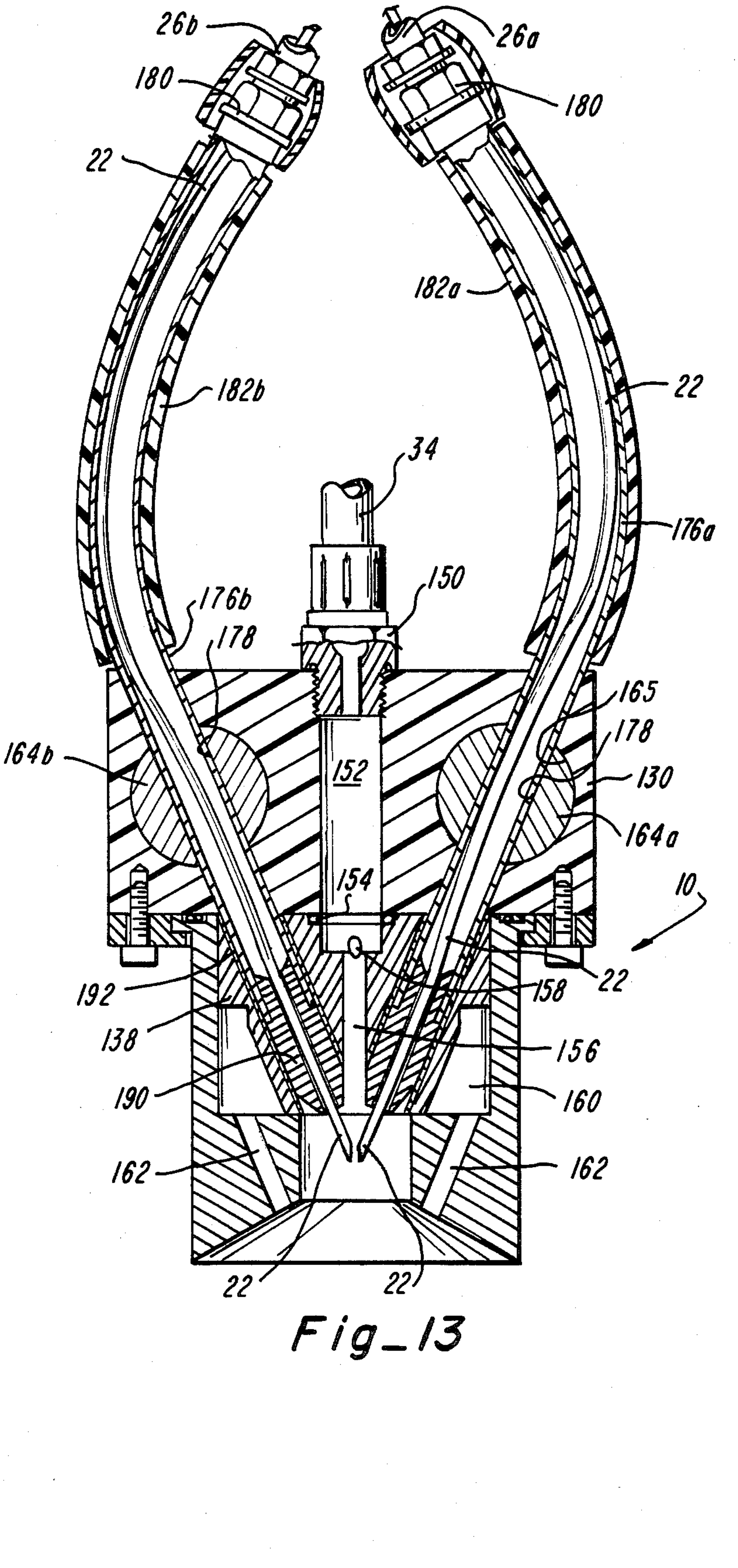

FIGS. 12 and 13 are enlarged section views of the spray gun, taken in the planes of lines 12—12 and 13—13 of FIG. 10, respectively.

Figure 14:
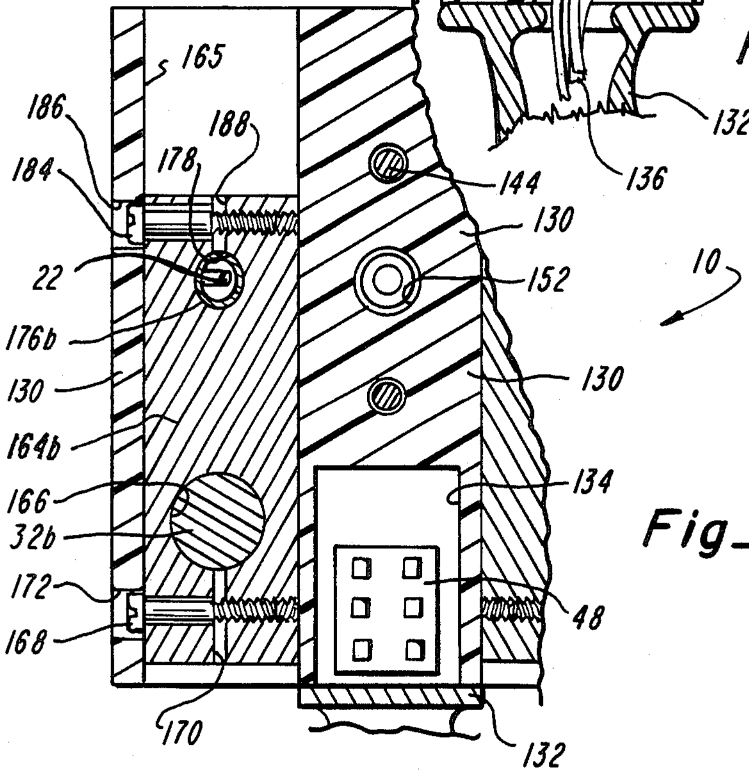

FIG. 14 is an enlarged partial section view taken in the plane on line 14—14 of FIG. 8.

FIG. 15 is a generalized representation of the elliptical or elongated spray stream and deposition pattern created by the spray gun shown in FIG. 8.

DESCRIPTION OF PREFERRED EMBODIMENTS

A presently preferred embodiment of the electric arc spray metalizing apparatus is shown in FIG. 1. The apparatus includes a spray gun 10, a wire feed drive mechanism 12, a conventional source 14 of electrical power, and a conventional source 16 of compressed gas such as air. The wire feed drive mechanism 12 includes a housing 18 which encloses the interior of the mechanism 12. As is shown in FIGS. 2 and 3, two spools 20 of wire 22 are located within the interior of the mechanism 12. The wire 22 is unrolled from each spool 20 and is pushed by a drive unit 24 through hollow electrically insulated cables *26a* and *26b* to the spray gun 10, as is shown in FIG. 1. Electrical energy from the source 14 is conducted by conductors *28a* and *28b* to the wire feed drive mechanism 12, through the mechanism 12 by internal conductor extensions *30a* and *30b* (FIGS. 2 and 3), and to the spray gun 10 by spray gun conductors *32a* and *32b*. Pressurized gas from the source 16 is supplied by a hose 34 to the feed wire drive mechanism 12. As is shown in FIGS. 2 and 3, the pressurized gas is conducted by a conduit 36 to a pair of conventional filters 38 and to a conventional pressure regulator and gas bleed device 40. The filtered and pressure regulated supply of pressurized gas is conducted through a second internal conduit 42 to the spray gun 10 through a connecting hose 44 as shown in FIG. 1.

The spray gun 10 receives the two wires through the cables *26a* and *26b*, receives the source of pressurized gas from the hose 44, and receives the electrical energy from the conduits 32*a* and 32*b*. A control cable 46 extends from the spray gun 10 to the wire feed drive mechanism 12. A control switch 48 (FIG. 9) directs control signals over the control cable 46 to enable the operator holding the spray gun to selectively control the delivery of the wire, electrical energy and pressurized gas to the spray gun. When operated, the spray gun delivers a spray stream 50 of molten atomized particles of metal which are deposited as a coating 52 on a substrate 54.

Details of the wire feed drive mechanism 12 are illustrated in FIGS. 2 and 3. The mechanism 12 includes a base frame structure 56 to which the other elements are operatively attached. A relatively large support wheel 58 is positioned within a closed interior envelope 60 formed by the frame structure 56. The envelope 60 separates the interior of the wire feed drive mechanism 12 from the exterior and positions the support wheel 58 at the exterior of the mechanism 12. A pair of casters 62 (only one is shown in FIGS. 1 and 2) is positioned on opposite lateral sides at the other end of the frame structure 56. The casters 62 and support wheel 58 support the drive mechanism 12 in a tricycle like relationship. The triangular support arrangement allows the drive mechanism 12 to be supported on uneven surfaces and allows it to be used in a variety of different environments.

The spools 20 of wire 22 are supported on shafts 64. The individual shafts 64 are connected at their inner ends to the envelope 60 and extend in transversely opposite directions from the envelope. The spools 20 of wire 22 can be easily changed by sliding the spools 20 over the shafts 64. A conventional holding arrangement is attached at the outer ends of the shaft 64 for holding the spools 20 on the shafts and allowing the spools to rotate and deliver the wire 22 to the drive units 24. When the housing 18 is closed, as shown in FIG. 3, the outer ends of the spools 20 are located interiorly of the housing, and contact between the spools 20 and the housing 18 is avoided.

A hinge 66 pivotally connects the housing 18 to the frame structure 56, at the end where the large wheel 58 is positioned. The housing 18 completely encloses the interior of the drive mechanism 12, but not in an airtight manner. Spaces exist between the edges of the housing 18 and the frame structure 56. As is best shown in FIG. 1, a cutout is formed in an end 68 of the housing to provide access to the cable, conductor and hose connections attached to an upstanding panel 70 of the frame structure 56, at the end where the casters 62 are attached. A handle 72 is attached to the housing 18 so that it may be pivoted about the hinge 66 as shown in FIG. 2.

Dust, dirt, grit and other airborne particles are prevented from entering the interior of the feed wire drive mechanism 12 at the spaces and gaps between the edges of the housing 18 and the frame structure 56 by supplying pressurized bleed air to the interior of the closed housing 18. The pressured air flows out of the gaps and spaces and prevents or substantially inhibits the entrance of the airborne particles. By preventing the airborne particles from entering the interior of the drive mechanism 12, the particles are not attracted to the electrically charged wires 22 and are thus not carried into the interior of the wire supply cables 26*a* and 26*b*. An accumulation of the material within the cables 26*a* and 26*b* is avoided, thus preventing an increase in wire movement resistance and causing the feed wire drive units to operate in a more reliable and intended manner. The source of pressurized gas for the interior of the feed wire drive mechanism 12 is the air bleed from the pressure regulator and bleed 40.

An electric motor 74 drives a gear box 76. Output drive shafts 78 from the gear box 76 supply operational force to the two wire feed drive units 24. Both wire feed drive units 24 are the same in structure and operation. Because the drive shafts 78 rotate in unison, the wire feed drive units 24 drive the wires 22 at the same rate through the cables 26*a* and 26*b*.

Details of the wire feed drive units 24 are illustrated in FIGS. 4 through 7. As the wire 22 is unrolled from the spool 20 (FIG. 2) it first encounters an aligning and straightening device 80. This device includes two stationarily positioned rollers 82 and a movable tension roller 84 positioned on the opposite side of the wire 22 from the stationary rollers 82. The tension roller 84 is attached to a movable block 86. The position of the roller 84 and block 86 is adjusted by a threaded screw 88. The position of the roller 84 is adjusted to straighten or counteract the inherent curvature of the wire 82 imparted by the coils on the spool. The outer peripheral shape of each of the rollers 82 and 84 has an indented configuration, such as a U-shaped or V-shaped configuration, to channel and direct the wire across each roller. The straightened wire is fed from the device 80 to the wire feed drive unit 24 through a hollow tubular guide 90.

Each wire feed drive unit 24 includes a pair of wire drive or contact means for contacting the wire at two laterally spaced positions and for driving or pushing the wire through the wire feed cable. Accordingly, the wire drive or contact means are tandemly positioned along the length of the wire 22. The wire drive or contact means preferably take the form of contact rollers 92 and 94. In the embodiment of the wire feed drive unit 24 shown in FIG. 4, additional contact rollers 96 and 98 operate in conjunction with the contact rollers 92 and 94, respectively. Accordingly, contact rollers 92 and 96 apply pushing force at one location on the feed wire and contact rollers 94 and 98 apply additional pushing force at another longitudely spaced location along the feed wire. A central guide 100 is located intermediate the contact rollers to prevent the wire between the tandemly positioned contact rollers from bending or deflecting. Another tubular guide 102 directs the wire from the drive unit 24 to the cables 26*a* and 26*b* (FIG. 1).

Rotating or driving force for the contact rollers 92, 94, 96 and 98 is supplied by a drive gear 104. The drive gear is connected to the drive shaft 78 of the gear box 76, as is shown in FIG. 7. Each contact roller 92, 94, 96 and 98 has connected thereto a rotating gear 106, 108, 110 and 112, respectively. The teeth of the rotating gears 106 and 108 directly mesh with the teeth of the drive gear 104. The rotating gears 110 and 112 are rotationally carried by lever arms 114 and 116. The lever arms 114 and 116 are privotally connected at an inner end 118 to a support frame 120 of the wire feed drive unit 24. The outer opposite ends of each of the lever arms 114 and 116 is forced downward by a spring 122 according to the amount of tension applied from a nut 124 on a threaded rod 126. The force from the spring 122 on the other end of the lever arms 114 and 116 forces the contact rollers 96 and 98 into frictional engaging contact with the wire 22 on the opposite side of the contact rollers 92 and 94 respectively. The downward force also meshes the teeth of the rotating gears 110 and 112 with the teeth of the directly driven rotating gears 106 and 108, respectively, as is illustrated in FIG. 6. Thus all four contact rollers, 92, 94, 96 and 98 are available to apply driving or pushing force to the wire 22 as a result of the tooth engaging relationship of the rotating gears 106, 108, 110 and 112 with the drive gear 104.

In addition to being able to adjust the amount of contact force and to accommodate different diameters of feed wire 22, the pivoting arrangement of the lever arms 114 and 116, which carry contact rollers 96 and 98 and the rotating gears 110 and 112, provides adequate access space for threading new wire 22 through the feed drive unit 24. The pivoted position of the lever arm 116 and the right hand (as shown in FIG. 4) assembly of the threaded rod 126, nut 124 and spring 122, is illustrated by phantom lines in FIG. 4. The feed drive unit 24 is similar to a wire drive unit available for use in certain types of automatic welders which use a consumable wire electrode.

Details of the spray gun 10 are illustrated in FIGS. 8 to 14. The spray gun 10 comprises a main support case 130 which positions and supports all other elements of the spray gun 10. The case 130 is preferably formed of electrically insulating material, such as high impact plastic or the like. A manipulating handle 132 is connected to the bottom of the case 130. The control switch 48 (FIGS. 9 and 12) is positioned within a recess 134 formed in the case 130. Electrical signals are conducted to and from the switch 48 by conductors 136 of the control cable 46. The operator is able to control the wire feed drive mechanism 12 and the operation of the electric arc spray metalizing apparatus by manipulating the control switch 48.

Attached to the front side of the case 130 are a shield 138, a spray pattern deflection housing 140, and a holding ring 142. The shield 138 is rigidly attached to the case 130 by bolts 144, as shown in FIGS. 11 and 12. The deflection housing 140 is rotatably mounted by virtue of a rotational connection provided by the surrounding holding ring 142. Bolts 146 hold the holding ring to the case 130. An O ring 148 fits between the rear end of the deflector 140 and the front face of the case 130 to provide an airtight fitting therebetween, but still to allow rotational movement of the deflection housing 140. In general terms, the purpose of the shield 138 is to position the two feed wires to intersect and make the arcing contact at a predetermined location, and to direct the pressurized stream of gas onto this intersection point and initiate the spray stream of molten atomized particles. The general function of the deflection housing 140 is to modify the spray stream into the generally oval or elongated spray stream configuration (FIG. 15) and to provide a means for adjusting the orientation of the elongated spray stream relative to the handle 132 by rotating the deflection housing 140. The function of the holding ring 142 is to rotably attach the deflection housing 140 to the case 130.

The hose 34, which supplies pressurized gas to the spray gun 10, is connected by fitting 150 into the rear of a channel 152 formed generally through the center of the case 130. An O ring 154 surrounds the channel 152 at the location where the shield 138 is attached to the case. The O ring 154 provides a fluid tight seal to confine the flow of pressurized gas from the channel 152 into a center bore 156 and into a pair of supply conduits 158. As shown in FIG. 13, the center bore 156 focuses the majority of the supplied pressurized gas into a jet stream and onto the arcing intersection point of the two wires 22. The pressurized gas which flows through the center bore 156 thereby defines the main axis for the spray stream eminating from the spray gun.

As shown in FIG. 12, the supply conduits 158 direct a portion of the pressurized air into an annular space 160 defined between the exterior of the shield 138 and the interior of the deflection housing 140. The pressurized gas in the annular space 160 is directed forward in a radially converging direction toward the axis of the spray stream through deflecting passageways 162. The gas from the deflecting passageways 162 deforms an otherwise circular spray pattern into the elongated spray pattern illustrated in FIG. 15. The deflecting passageways 162 are diametrically opposite of the axis and extend in a forward converging direction at approximately the same angle with respect to the axis of the gas flow stream and the center bore 152.

Electrical energy from the spray gun conductors *32a* and *32b* is applied to a pair of holders *164a* and *164b*, respectively. Cylindrical openings 165 are formed in the case to receive the holders. The conductive end of one spray gun conductor *32a* or *32b* is inserted into a lower circular end 166 of each holder *164a* or *164b* and a bolt 168 is tightened to compress the material of the holder around the end of the conductor by virtue of the slot 170. Access openings 172 are formed in the case 130 for the purpose of tightening the screws 168. The holders *164a* and *164b* are formed of metallic electrically conductive material such as copper.

Relatively long, curved, electrically-conductive wire guides *176a* and *176b* extend through openings 178 formed in each holder *164a* and *164b*. The rear end of each wire guide *176a* and *176b* is connected by conventional connector 180 to the feed wire cables *26a* and *26b*, respectively. The wires 22 are directed from the feed wire cables *26a* and *26b* into the interior of the wire guides *176a* and *176b* and physically contacts the wire guides. Electrical energy is transferred from the holders *164a* and *164b* to the wire guides *176a* and *176b* and is conducted from the wire guides to the wires 22. By curving the wire guides *176a* and *176b*, the wire 22 will contact the wire guides and assure a relatively good connection by which the electrical energy is transferred. Insulating tubes *182a* and *182b* cover and insulate the exposed curved portions of the wire guides *176a* and *176b*, respectively.

The wire guides *176a* and *176b* are retained in the openings 178 of the holders *164a* and *164b*, respectively, by a bolt 184. An access opening 186 is formed in the case 130 by which to gain access to the bolt 184 for tightening. A slot 188 in each holder allows the material surrounding the opening 178 to compress around the wire guides when the bolt 184 is tightened.

The forward ends of the wire guides *176a* and *176b* extend into the shield 138, as is shown in FIG. 13. Tip guides 190 fit into the forward end of the wire guides and also within openings 191 in the shield 138. An electrically-insulating jacket 192 surrounds the forward end of the wire guides and tip guides to insulate both from the shield 138. The tip guides 190 direct the wires 22 to the arcing intersection point. The tip guides 190 are also formed of conductive material to further conduct the electrical energy to the feed wires. Since the wires 22 become energized at the spray gun 10, they conduct back to the spools within the wire feed drive mechanism 12. Consequently, each spool 20 of wire 22 must be positioned in an electrically insulated location within the wire feed drive mechanism 12 to avoid electrical contact with the frame 56 or other elements of the mechanism 12 (FIGS. 2 and 3.). Similarly, the feed wire drive units 24 and their associated aligning and straightening devices 80 are electrically insulated from the frame structure 56 by means not specifically shown, to prevent electrical shorting between the two charged wires 22 in the wire feed drive mechanism 12.

The electrical power source 14 of the apparatus shown in FIG. 1 is a conventional item. Preferably, the source 14 is a conventional DC rectifier for supplying relatively low voltage, high current electric energy. When using ⅛inch diameter aluminum wire in the apparatus of the present invention, the power source 14 should be capable of continuously supplying approximately 600 amps of current at about 30 volts.

The gas pressure source 16 is also a conventional item. A variety of different sources can be employed, but the most common use is a conventional source of compressed air.

To operate the present invention, the operator switches the control switch 48 on the back of the spray gun 10. The signal supplied in the control cable 46 energizes the motor 74 of the wire feed drive mechanism. The contact rollers 92, 94, 96 and 98 of each wire feed drive unit 24 commence rotating and pushing the wire to the arcing intersection point within the spray gun. Electrical energy is conducted to the feed wires and they are consumed at the intersection point in an electric arc. The compressed gas is directed at the arc intersection point and the molten atomized particles of material are directed in the spray stream 50. The spray stream is formed into the elongated pattern shown in FIG. 15 by the gas jets from the deflecting passageways 162. The elongated spray pattern shown in FIG. 15 allows a more uniform deposition of the molten particles in a coating 52, as opposed to a highly concentrated center deposition of particles if the spray pattern was circular. Accordingly a more uniform application of the coating is achieved without four or six passes over the same area of the substrate made by the operator, as is typically required with circular spray patterns in prior electric arc spray metalizing apparatus having circular spray patterns. The orientation of the elongated spray pattern is easily adjusted by rotating the deflection housing. The operator can easily conform the orientation of the spray pattern to the particular shape of the substrate without having to hold the spray gun in an awkward, uncomfortable position. The tandem arrangement of driving contact rollers of each wire feed drive unit assures improved driving force for forcing the feed wires through the wire feed cables. By pressurizing the interior of the wire feed drive mechanism 12, the dust, dirt, grit and other airborne particles are prevented from entering the wire feed drive mechanism and being attracted to the charged feed wires. Accumulations of these foreign materials in the feed wire drive cables are thereby avoided. The wire feed drive mechanism is advantageously separated from the electrical power source, to enable it to be conveniently moved or positioned for advantageous use. This is in contrast to the common practice in the prior art where the wire feed mechanism and the power supply are incorporated in a single enclosure.

The nature, operation and improvements of the present invention have been shown and described with a degree of specificity. It should be understood, however, that the specificity of description has been made by way of preferred example and that the invention is defined by the scope of the appended claims.

The invention claimed is:

1. An electric arc spray metalizing apparatus for applying a metalizing coating to a substrate comprising, in combination:

a spray gun;

means for connecting a pair of hollow elongated feed wire feed cables at one end to the spray gun, each cable adapted for directing a metallic wire therethrough to the spray gun;

wire feed drive means adapted to be connected to the other end of each cable and operative for pushing a wire through each cable, said wire feed drive means comprising a pair of drive contact means contacting each wire in a tandem relationship and operative to individually impart driving force to push the wire into the cable;

means within the spray gun for conducting electrical energy to each wire;

means within the spray gun for directing the wires into an intersection point at which an arc of sufficient electrical energy conducted between the wires will consume the wires as molten metal at the intersection point;

means within the spray gun for conducting a flow stream of pressurized gas into the intersection point to atomize the molten metal and produce a spray stream of molten metal particles to transport the molten metal particles to the substrate in a generally elliptical deposition pattern;

housing means connected to the wire feed drive means and defining an interior and operative for shielding from the ambient environment a supply of the wire supplied to each cable and the other end of each cable and the drive contact means; and means for supplying pressurized gas to the interior of the housing means to substantially prevent the entrance of ambient particles into the interior of the housing means through existing spaces as a result of the pressurized gas flowing out of the interior of the housing means at the spaces.

2. Apparatus as defined in claim 1 further comprising, in combination:

a source of pressurized gas, hose means for conducting pressurized gas from the gas source to the housing means to the spray gun, the pressurized gas conducted to the spray gun establishing the flow stream and the spray stream of molten metal particles, and at least a portion of the pressurized gas conducted to the housing means establishing the supply of pressurized gas within the interior of the housing means.

3. Apparatus as defined in claim 1 further comprising within the spray gun:

means for directing at least one deflecting stream of pressurized gas onto at least one of the flow stream or spray stream to form the spray stream into the elliptical deposition pattern.

4. Apparatus as defined in claim 1 wherein the housing means is movably connected relative to the wire feed drive means to move to a position in which the drive contact means and the supply of wire are selectively exposed.

5. In an electric arc spray metalizing apparatus for applying a metalizing coating to a substrate, and which includes a spray gun having means for consuming a pair of wires in an electric arc and transporting molten metal particles from the wires in a spray stream to the substrate, a pair of hollow cables connected at one end to the spray gun and through which the wires are supplied to the spray gun, a wire feed drive mechanism connected to the other end of the cables and including a supply of wire and means for pushing one wire through each cable to the spray gun, and an improvement in combination therewith comprising:

a housing having an interior within which the wire feed drive mechanism is located, the housing separating the other end of the cables and the supply of wires and the pushing means from the ambient environment, and means for supplying pressurized gas to the interior of the housing to inhibit the entrance of airborne particles into the interior of the housing at open spaces in the housing, said wire feed drive means comprising a pair of drive contact means contacting each wire in a tandem relationship and operative to individually impart driving force to push the wire into the cable.

* * * * *